United States Patent [19]

Luckenbach

[11] 4,397,816

[45] Aug. 9, 1983

[54] APPARATUS FOR REGENERATION OF SPENT CRACKING CATALYST

[75] Inventor: Edward C. Luckenbach, Mountainside, N.J.

[73] Assignee: Exxon Research and Engineering Co., Florham Park, N.J.

[21] Appl. No.: 323,765

[22] Filed: Nov. 23, 1981

[51] Int. Cl.³ .............................................. F27B 15/08
[52] U.S. Cl. ..................................... 422/144; 422/214
[58] Field of Search ........................ 422/143, 144, 214

[56] References Cited

U.S. PATENT DOCUMENTS

| 2,382,382 | 8/1945 | Carlsmith et al. | 422/144 X |
| 2,394,710 | 2/1946 | McAfee | 422/144 X |
| 2,427,112 | 9/1947 | Tyson | 422/144 X |
| 2,451,619 | 10/1948 | Hengstebeck et al. | 422/144 X |
| 2,477,345 | 7/1949 | Pelzer | 422/144 X |
| 2,589,124 | 3/1952 | Packie | 422/144 X |
| 2,667,448 | 1/1954 | Munday | 422/144 X |
| 3,841,843 | 10/1974 | Williams et al. | 422/214 X |
| 4,272,402 | 6/1981 | Mayes | 422/144 X |

Primary Examiner—Marc L. Caroff
Attorney, Agent, or Firm—Llewellyn A. Proctor

[57] ABSTRACT

Apparatus wherein spent, coked catalyst is admixed with combustion air externally of the regenerator and then introduced into the lower portion of a dense phase fluidized bed of said regenerator via an inlet. The inlet is characterized as an annulus, annular area or zone around a regenerated catalyst standpipe from which regenerated catalyst is removed from the regenerator and recycled to the reactor. Generally from about 3 percent to about 20 percent, preferably from about 5 percent to about 10 percent, of the total air introduced into the regenerator is introduced in this manner and balance of the air, which is in itself sufficient for complete combustion, is introduced via a separate air inlet into the regenerator. Disc and doughnut shaped gas distributors disposed within the annular inlet and a radial distributor plate disposed above the inlet provide a more even flow of the spent, coked catalyst into the regenerator with the result that the coke is burned from the catalyst in the lower portion of a dense phase fluidized bed and a flue gas of more constant composition is produced throughout the regenerator. Hydrocarbon contaminants from the reactor, not removed by stripping, are also effectively burned in the lower portion of the dense phase fluidized bed and as a result, the flue gas generated in this portion of the catalyst bed differs little from flue gas formed in other parts of the bed.

6 Claims, 3 Drawing Figures

APPARATUS FOR REGENERATION OF SPENT CRACKING CATALYST

BACKGROUND OF THE INVENTION AND PRIOR ART

In a fluid catalytic (cat) cracking unit, catalyst is circulated in transfer lines between two vessels, a reactor and a regenerator; each of which can be provided with a dense phase fluidized bed of the catalyst. The feed, generally a gas oil, is preheated and injected usually with recycle feed, into one of the circulating lines which contains hot regenerated catalyst which is being moved, or transported, from the regenerator to the reactor. The catalyst vaporizes the fresh feed and recycle feed, and the vapor with steam is injected to atomize the liquid feed, and fluidize the catalyst. The feed is cracked at about 900° F. in the fluidized bed of the reactor in an endothermic reaction which consumes the heat brought from the regenerator by the catalyst. Coke is deposited on the catalyst, this inevitably lessening its activity. The cracked products from the reactor are passed through a staged cyclone separator system which collects entrained catalyst fines and returns them to the reactor. The vapors are passed to a primary fractionator, which separates the gasoline and lighter products from the heavy products. The gasoline and lighter products are sent to a light ends recovery unit while the heavy material is separated and recycled to the reactor, or withdrawn from the unit.

Regeneration of the catalyst by the removal of deposited coke, and heat balance of the unit are both essential; and in commercial operations both are interrelated. Spent catalyst is withdrawn from the bottom of the reactor, stripped with steam, and then recycled, or conveyed by a stream of air into the regenerator where deposited coke is burned from the catalyst in a dense phase fluidized bed at temperatures ranging from about 1100° F. to 1400° F. Entrained catalyst is removed by staged cyclone separators, and flue gas is removed from the stack. The hot regenerated catalyst is withdrawn from the regenerator and transported to the reactor to supply heat to the latter.

The spent catalyst recycled to the regenerator contains some unburned hydrocarbons, since it is not possible by present techniques to remove all of the hydrocarbon vapors from the catalyst by stripping. Hence, some hydrocarbon products are carried from the reactor to the regenerator and burned; this consuming some of the regeneration air, and decreasing the yield of useful products. In the combustion, it is desirable to burn all of the coke in the regenerator to carbon dioxide; which, if possible, is certainly not practical. Carbon monoxide is also formed. Carbon monoxide in the flue gas, however, represents wasted heat values, except to the extent that the carbon monoxide can be burned in downstream equipment for recovery of the wasted heat. The flue gases leaving the regenerator differ in composition depending upon the part of the regenerator bed the gases leave since there is only a small amount of lateral mixing of the gases ascending through the regenerator bed. Variations in the carbon monoxide-containing flue gas composition leaving the regenerator can be troublesome. This is because the flue gas is often burned with air in a steam generator, or in a furnace which directly warms the fresh feed or heats other refinery streams. Variations in the carbon monoxide content of the flue gas creates undesirable process instability.

It is desirable to burn all the carbon monoxide in a cat cracker regenerator to very low values, i.e., 500 ppm or less, to meet air polution regulations directly, or to conserve all the heat of combustion in the process. In this case it is desirable to have as good a gas distribution as possible inasmuch as it reduces the amount of excess oxygen required to meet the desired low carbon monoxide level. For example, a unit with poor solids/gas distribution may require an excess oxygen content of 2 to 3 percent to obtain a 500 ppm carbon monoxide level, while a unit that has good solids/air distribution can achieve the 500 ppm level with only 0.5 percent excess air.

Some compensation for this unequal distribution of gases in the regenerator bed might be provided by introducing additional air at the location where the catalyst enters the vessel. However, this results in high local gas velocities in the bed which does little to dispose of the problem, and in fact may introduce new problems.

It is, accordingly, the primary objective of the present invention to provide improved apparatus, and process whereby the velocity distribution of air is equalized throughout the bed.

A more specific object is to provide improvements in a regenerator which will divert the gases entering into the dense phase fluidized bed of said regenerator outwardly, and more evenly, this producing more uniform flow of spent coked catalyst into the regenerator bed and the generation of a more uniform flue gas composition throughout the regenerator.

These objects and others are achieved in accordance with the present invention embodying apparatus and process wherein spent, coked catalyst is admixed with combustion air externally to the regenerator and introduced through an annulus, annular area or zone around the spent, coked catalyst standpipe from which regenerated catalyst is removed from the regenerator and recycled to the reactor. Generally from about 3 percent to about 20 percent, preferably from about 5 percent to about 10 percent, of the total air introduced into the regenerator is introduced in this manner and the balance of the air, which is in itself sufficient for complete combustion, is introduced via a separate air inlet into the regenerator. This produces a more even flow of the spent, highly coked catalyst into the regenerator with the result that the coke is burned from the catalyst and a flue gas of more constant composition is produced throughout the regenerator. Hydrocarbon contaminants from the reactor, not removed by stripping, are also effectively burned and as a result, the flue gas generated in this portion of the catalyst bed differs little from flue gas formed in other parts of the bed.

The invention, and its principle of operation, will be better understood by reference to the following more detailed description, and to the attached drawings, to which reference is made in the description.

Figure 1:
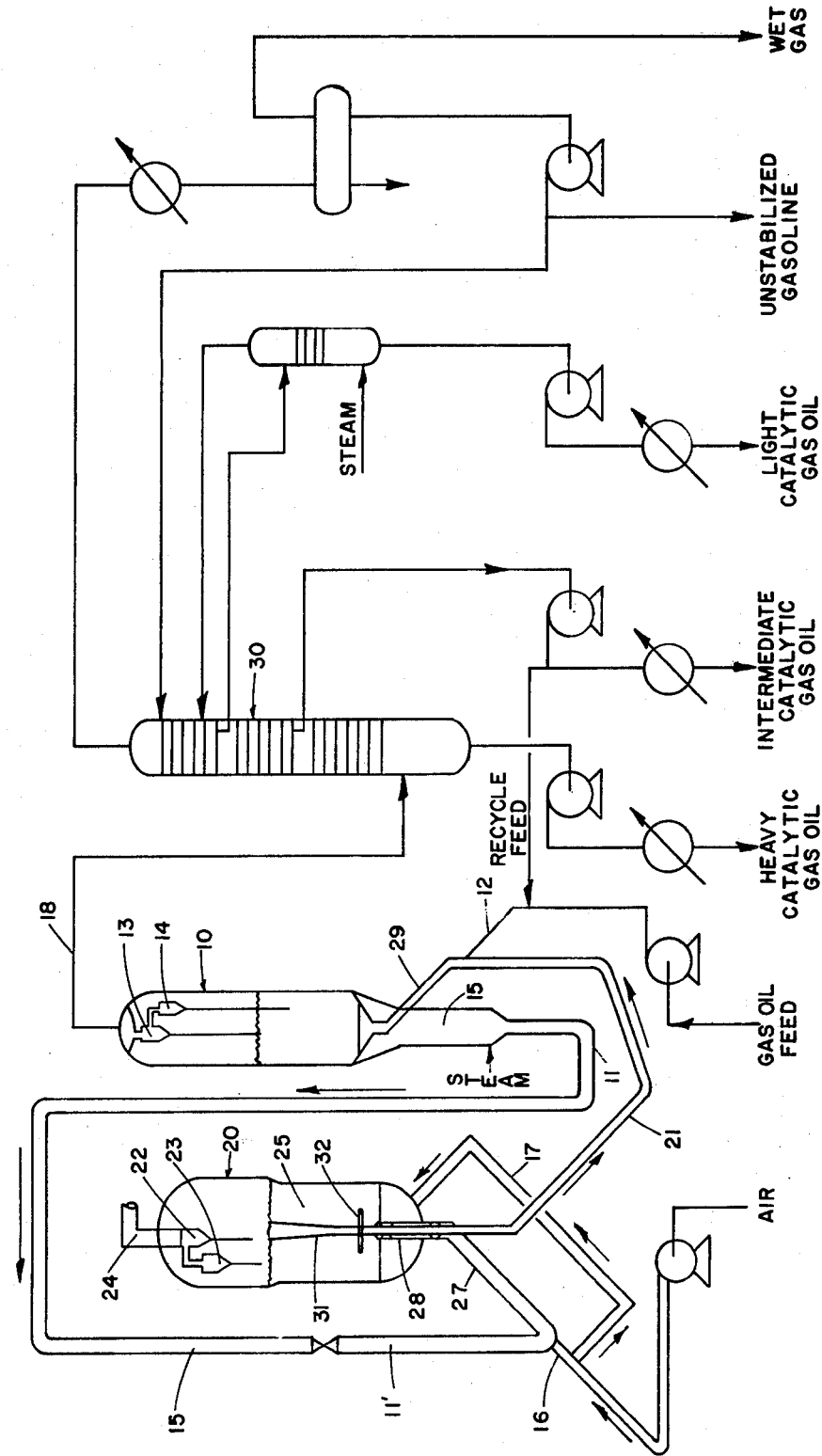
FIG. 1 depicts, for the most part schematically, a flow diagram of a cat cracking unit, inclusive of reactor, regenerator, and other downstream production facilities.

Referring first to FIG. 1, there is described generally a reactor 10, a regenerator 20, and a fractionation column or fractionator 30 into which off gas from the reactor 10 is fed and fractionated into various product fractions, inclusive of heavy, intermediate and light catalytic gas oil fractions, unstabilized gasoline and wet gas. The usual feed to the reactor 10 is a virgin gas oil, or portion of a crude oil boiling between about 600° F. and 1050° F. which contains an admixture of aromatics, naphthenes and paraffins.

Catalyst is circulated rapidly in the U-bend transfer lines 11,21 between the reactor 10 and regenerator 20. The feed, which is usually a heavy gas oil, is preheated and injected via line 12 into the stream of regenerated catalyst moving from the regenerator 20 to the reactor 10. The hot catalyst vaporizes the oil, and the vapors help to fluidize the catalyst in the reactor. This mixture flows into the reactor 10 where cracking takes place at temperatures usually ranging from 900° to 1000° F. The reaction is endothermic and consumes the heat brought from the regenerator 20 by the catalyst.

The cracked products pass out of reactor 10 through two stages of cyclones 13,14 which collect entrained catalyst and returns it to the dense phase fluidized bed. Velocities at the outlet of the dense bed are normally 2.0-2.5 ft./sec. Upon leaving the cyclones, the vapors are transmitted via line 18 to the primary fractionator 30 which separates the heavy products from the gasoline and lighter components. The light products are passed on to the light ends recovery unit, a unit which forms no part of the present invention. The heavy material is separated and either recycled to the reactor 10 or withdrawn from the system.

Carbon, or coke, is all too rapidly deposited on the surface of the catalyst and covers the active sites and, since the activity falls so rapidly, it is desirable to regenerate as often as possible. In normal operation, the catalyst is held in the reactor stripper vessel 10 only about 1-2 minutes. This is accomplished by the rapid circulation of catalyst between reactor 10 and regenerator 20 via lines 11,21, which in the large units may represent a solids transfer as high as 40-50 tons/minute.

The spent catalyst is withdrawn from the bottom of the reactor 10, 11 through stripper 15. Spent catalyst is stripped with steam in the stripper 15 to vaporize the hydrocarbons remaining on the surface of the catalyst. Stripping also removes most of the hydrocarbon vapors which are entrained between the particles of catalyst, this preventing most of the hydrocarbon products from being carried to the regenerator 20 and needlessly burned to consume much of the regeneration air, and decrease the yield of useful products.

The stripped catalyst from line 11 enters spent catalyst riser 27 and is picked up by a stream of air introduced via line 16 and carried via the diagonal oriented catalyst riser 27, and line 28 into the regenerator 20 where the carbon is burned at temperatures about 1100°-1400° F. Entrained catalyst is again removed by staged cyclones 22,23 and the flue gas is emitted through the stack 24. The hot, regenerated catalyst leaving the regenerator 20 via line 21 takes with it much of the heat of combustion. The heat carried over to the reactor 10 vaporizes the feed and balances the endothermic heat of cracking. Thus, the process is heat balanced.

Figure 2:
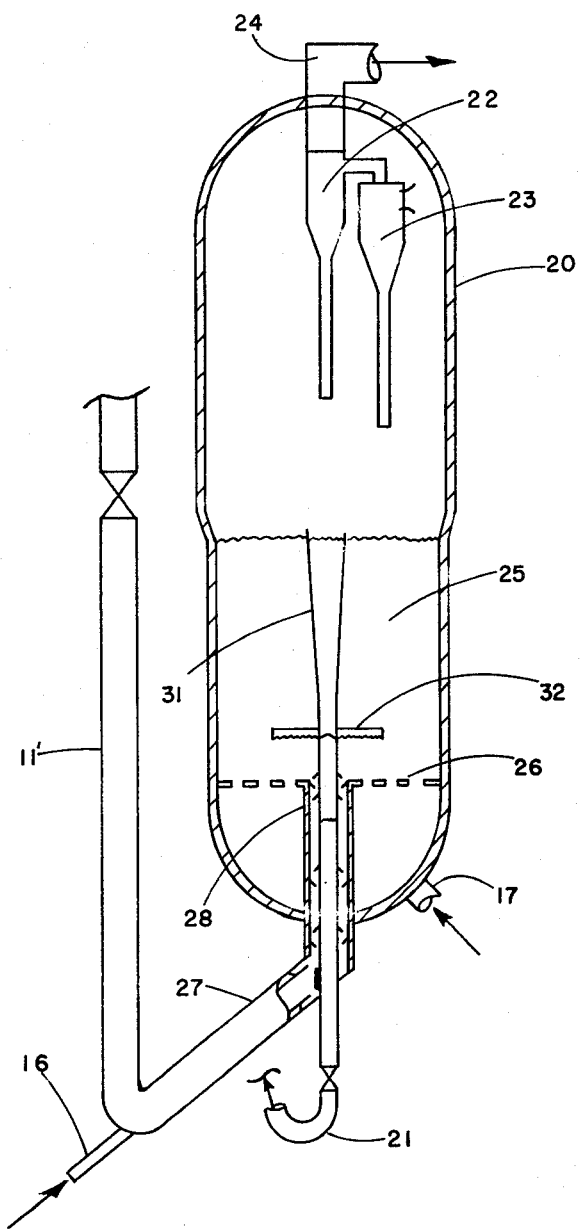
FIG. 2 depicts in partial section the pertinent portions of the regenerator, including particularly the improved apparatus features related to the present invention.

With reference to FIG. 2, the regenerator 20 includes a hollow regenerator vessel, the upper portion of which is provided with a pair of staged cyclones 22,23 and flue gas outlet 24. The lower portion of the regenerator vessel contains, or can contain, a dense phase fluidized bed of catalyst 25 which is supported atop a perforated grid 26. The catalyst in reactor 10 is gradually deactivated by the formation of coke on the catalyst, and consequently the catalyst is transported from the reactor 10 via line 11 to said regenerator 20 wherein coke is burned from the coked catalyst and reactivated. Spent, coked catalyst is conveyed from the reactor 10 to the catalyst regenerator 20 by means which include a spent, coked catalyst standpipe 11 and the diagonally oriented coked catalyst riser 27 operatively communicated with said spent, coked catalyst standpipe 11. Air can be injected via line 16 into the coked catalyst riser 27 to transport said catalyst, and introduce at least a portion of the air requirements, or an excess of air into said dense phase fluidized catalyst bed 25 of the spent, coked catalyst regenerator 20 for regeneration of the catalyst. The regenerator 20 also includes a vertically oriented regenerated catalyst standpipe outlet 31 for recycle of regenerated catalyst via line 21 and a regenerated catalyst riser 29 (FIG. 1) to the reactor 10.

Figure 3:
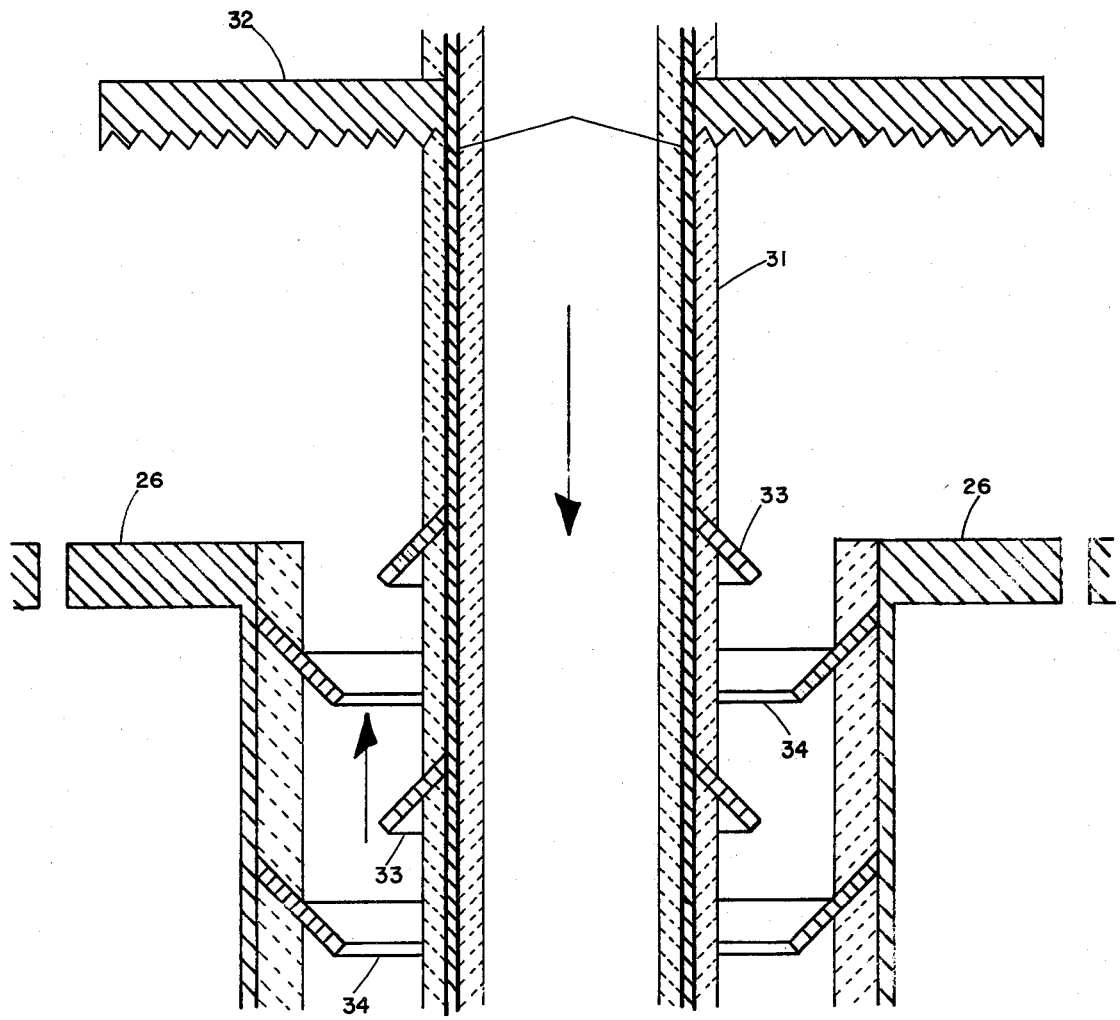
FIG. 3 depicts in partial section these improved apparatus features in somewhat greater detail that presented by the preceding figure.

The improvements which constitute key and novel features of the present invention are best described by continued reference to FIG. 2, and by further reference to FIG. 3. These improvements include a conduit 11 communicated with said spent, coked catalyst riser 27, which extends via members 27,28 into the lower end of said regeneration vessel 20. The wall of member 28 surrounds said regenerated catalyst standpipe outlet 31 and forms an annulus, or annular zone through which spent, coked catalyst and air can be passed into the dense phase fluidized bed 25 of said regenerator vessel 20. This combination also includes a radial distributor plate or baffle 32 located within said regenerator vessel 20 adjacent to the terminal end of said annulus, the distributor plate 32 lying within the path of the spent, coked catalyst and transporting air entering into the regenerator 20 and against which the spent, coked catalyst and air are impinged and substantially uniformly dispersed outwardly within the dense phase fluidized bed 25 of the regenerator vessel 20. Preferably, the lower face of the distributor plate 32 is notched. Disc and doughnut gas distributors 33, 34 are circumferentially dispersed about the inside wall of the conduit and along the outside wall of said regenerated catalyst standpipe outlet forming said annulus to aid in creating a more uniform flow of air and catalyst into the dense phase fluidized bed 25 of said regenerator 20.

The spent, coked catalyst riser 27 which conveys catalyst from said reactor 10 to said regenerator 20, it will be observed, is diagonally disposed relative to the horizontal, the segment of the conduit 28 which forms the annulus about said regenerated catalyst standpipe outlet 31 is vertically oriented, the portion of the regenerated catalyst standpipe outlet about which said conduit is disposed is likewise vertically oriented, and the deflector plate 32 is located upon the outer wall of the regenerated catalyst standpipe outlet 31 within the annulus at the location wherein the spent, coked catalyst riser is operatively communicated with said conduit. The annular inlet, it will be observed, empties into the very bottom of the dense phase fluidized bed. This is so that the coke begins to burn from the coked catalyst near the bottom of the bed. Consequently, the catalyst near the top of the dense phase fluidized bed will be of low carbon level, and hydrocarbons that enter with the coked catalyst will be consumed at the bottom of the bed. Hence, any combustable material leaving the top of the bed will be burned by the oxygen leaving the bed down to a very low carbon monoxide level.

It is apparent that various modifications and changes can be made without departing the spirit and scope of the invention.

Having described the invention, what is claimed is:

1. In apparatus embodying a spent, coked catalyst regenerator as used in combination with a hydrocarbon conversion reactor, each of which can contain a dense phase bed of fluidized catalyst, wherein hydrocarbons can be converted within said reactor at reaction conditions by contact with the dense phase bed of the said catalyst, the catalyst in said reactor becoming gradually deactivated by the formation of coke on the catalyst, and the catalyst transported from the reactor to said regenerator wherein coke is burned from the coked catalyst and reactivated by means which include
   a spent, coked catalyst standpipe through which spent, coked catalyst is conveyed from the reactor to the catalyst regenerator,
   a spent, coked catalyst riser operatively communicated with said spent, coked catalyst standpipe for receipt of coked catalyst therefrom, and into which air is injected to transport said catalyst, and introduce at least a portion of the air requirements into said dense phase fluidized catalyst bed of the spent, coked catalyst regenerator for regeneration of same by burning coke from the catalyst,
   a regenerated catalyst standpipe outlet for recycle of regenerated catalyst via a regenerated catalyst riser to the reactor,
   the improvement comprising
   a conduit communicated with said spent, coked catalyst riser extending into the lower end of said regeneration vessel, the wall of the conduit surrounding said regenerated catalyst standpipe outlet forming an annulus through which spent, coked catalyst and air can be passed into the dense phase fluidized bed of said regenerator,
   disc and doughnut shaped gas distributors circumferentially dispersed about the inside wall of said conduit and along the outside wall of said regenerated catalyst standpipe outlet forming said annulus to aid in creating a more uniform flow of air and catalyst into the dense phase fluidized bed of said regenerator, and
   a radial distributor plate located within said regenerator adjacent to the terminal end of said annulus, the distributor plate lying within the path of the spent, coked catalyst and transporting air entering into the regenerator and against which the spent, coked catalyst and air are impinged and substantially uniformly dispersed outwardly within the dense phase fluidized bed of the regenerator.

2. The apparatus of claim 1 wherein the lower face of the distributor plate against which the air and catalyst are impinged is notched.

3. The apparatus of claim 1 wherein the spent, coked catalyst riser which conveys catalyst from said reactor to said regenerator, is diagonally disposed relative to the horizontal, the conduit which forms the annulus about said regenerated catalyst standpipe outlet is vertically oriented, the portion of the regenerated catalyst standpipe outlet about which said conduit is disposed is likewise vertically oriented, and the radial distributor plate is located upon the outer wall of the regenerated catalyst standpipe outlet.

4. The apparatus of claim 1 wherein a plurality of the disc shaped gas distributors are spaced apart one from another and located on the outside wall of the regenerated catalyst standpipe outlet.

5. The apparatus of claim 1 wherein a plurality of the doughnut shaped gas distributors are spaced apart one from another and located on the inside wall of said conduit which surrounds said regenerated catalyst standpipe outlet.

6. The apparatus of claim 1 wherein a plurality of the disc shaped gas distributors are spaced apart one from another and located on the outside wall of the regenerated catalyst standpipe outlet, a plurality of the doughnut shaped gas distributors are spaced apart one from another and located on the inside wall of said conduit which surrounds said regenerated catalyst standpipe outlet, and these members are alternately disposed one with respect to the other.

* * * * *